US010850862B2

(12) United States Patent
Black et al.

(10) Patent No.: US 10,850,862 B2
(45) Date of Patent: Dec. 1, 2020

(54) SYSTEMS AND METHODS FOR SIGNALING DURING AERIAL REFUELING OPERATIONS

(71) Applicant: The Boeing Company, Chicago, IL (US)

(72) Inventors: David J. Black, Chicago, IL (US); Roger K. Dang, Chicago, IL (US)

(73) Assignee: The Boeing Company, Chicago, IL (US)

( * ) Notice: Subject to any disclaimer, the term of this patent is extended or adjusted under 35 U.S.C. 154(b) by 721 days.

(21) Appl. No.: 15/615,076

(22) Filed: Jun. 6, 2017

(65) Prior Publication Data

US 2018/0346315 A1    Dec. 6, 2018

(51) Int. Cl.
| | |
|---|---|
| *B64D 39/04* | (2006.01) |
| *B64D 47/02* | (2006.01) |
| *B64D 39/06* | (2006.01) |

(52) U.S. Cl.
CPC ............. *B64D 39/04* (2013.01); *B64D 39/06* (2013.01); *B64D 47/02* (2013.01); *B64D 2203/00* (2013.01)

(58) Field of Classification Search
CPC combination set(s) only.
See application file for complete search history.

(56) References Cited

U.S. PATENT DOCUMENTS

| | | | |
|---|---|---|---|
| 9,067,689 B2 | 6/2015 | Chang | |
| 9,278,761 B2* | 3/2016 | Black | B64D 47/08 |
| 2009/0015436 A1 | 1/2009 | Lundberg et al. | |
| 2009/0032711 A1 | 2/2009 | Hewitt et al. | |
| 2009/0302161 A1* | 12/2009 | Mouskis | B64D 39/04 |
| | | | 244/135 A |
| 2010/0217526 A1* | 8/2010 | McElveen | B64D 39/00 |
| | | | 701/300 |
| 2013/0068889 A1* | 3/2013 | Richardson | B64D 39/00 |
| | | | 244/135 A |
| 2014/0358335 A1 | 12/2014 | Sanchez Ruiz | |
| 2015/0083864 A1* | 3/2015 | Black | B64D 39/00 |
| | | | 244/135 A |

* cited by examiner

*Primary Examiner* — Travis R Hunnings
(74) *Attorney, Agent, or Firm* — McDonnell Boehnen Hulbert & Berghoff LLP

(57) ABSTRACT

An example indication system for use with a refueling system including a hose for supplying fuel from a tanker aircraft to a receiver aircraft and a refueling coupler coupled to an end of the hose is described. The indication system includes a first transceiver located at the refueling coupler and configured to receive refueling information from a second transceiver located at the tanker aircraft, a plurality of light sources located at the refueling coupler, and a processor in communication with the first transceiver to receive the refueling information, and in communication with the plurality of light sources to operate the plurality of light sources based on the refueling information.

20 Claims, 11 Drawing Sheets

SYSTEMS AND METHODS FOR SIGNALING DURING AERIAL REFUELING OPERATIONS

FIELD

The present disclosure generally relates to systems and methods for vehicle refueling, and more particularly, to refueling systems and methods for providing indications to a receiver vehicle during refueling operations.

BACKGROUND

During refueling operations, such as aerial refueling operations for example, a tanker aircraft supplies fuel to a receiver aircraft while in-flight. One approach to aerial refueling is known as probe-and-drogue refueling. In a probe-and-drogue system, the tanker aircraft extends a flexible hose having a refueling coupler (commonly referred to as a drogue) disposed at a distal end of the hose. The receiver aircraft has a probe, which the receiver aircraft maneuvers into engagement with the drogue. After the probe couples to the drogue, the tanker aircraft supplies fuel to the receiver aircraft provided the receiver aircraft remains within a predetermined fuel transfer zone.

During an aerial refueling operation, the receiver aircraft is generally responsible for maneuvering relative to the tanker aircraft to couple the probe on the receiver aircraft with the drogue of the tanker aircraft. Once coupled, the receiver aircraft attempts to maintain a position within the fuel transfer zone so that the receiver aircraft can receive fuel at a safe distance of separation from the tanker aircraft.

Currently, several pieces of information are required by a pilot of the receiver aircraft when refueling the receiver aircraft during flight. Examples of such information include the distance between the drogue and the tanker aircraft (e.g., fuel transfer zone), a status of the drogue (e.g., engaged with the receiver aircraft), and a status of the tanker (e.g., ready to provide fuel). The flexible hose includes markings at various locations along a length of the hose to indicate the boundaries of a refueling range and the fuel transfer zone. The tanker includes a lighting system, installed on the fuselage of the tanker aircraft that provides indication of the status of the tanker. Accordingly, to successfully perform a refueling operation, the pilot of the receiver aircraft must monitor the status of both the signal lights on the tanker and the markings on the hose to determine the tanker refueling system status and the position of the receiver aircraft relative to the fuel transfer zone in order to maneuver or maintain the receiver aircraft position appropriately to receive fuel from the tanker safely. This has many drawbacks including that the markings on the hose may be challenging for the pilot to observe when operating under low-light conditions such as, for example, during night operations and/or during inclement weather. Additionally, the pilot has to continuously shift focus between the hose markings and the tanker lighting system during the refueling operation. Furthermore, at night, the markings on the hose can sometimes be confused with lighting glare giving a false indication. Unfavorable sun angles during daytime and in-contact turns may impose additional challenges to the receiver pilot's workload and safe operations.

What is needed is a centralized and discernible system that provides all information currently available to the receiver aircraft to be displayed at the drogue itself so the pilot only needs to focus on a single point enabling the information to be deciphered quickly and precisely in order to take appropriate actions in a timely manner.

SUMMARY

In an example, an indication system for use with a refueling system including a hose for supplying fuel from a tanker aircraft to a receiver aircraft and a refueling coupler coupled to an end of the hose is described. The indication system includes a first transceiver located at the refueling coupler and configured to receive refueling information from a second transceiver located at the tanker aircraft, a plurality of light sources located at the refueling coupler, and a processor in communication with the first transceiver to receive the refueling information, and in communication with the plurality of light sources to operate the plurality of light sources based on the refueling information.

In another example, an indication system for use with a refueling system including a hose for supplying fuel from a tanker aircraft to a receiver aircraft and a refueling coupler coupled to an end of the hose is described. The indication system includes one or more sensors located at the refueling coupler to provide feedback regarding the status of the refueling system, a first transceiver located at the refueling coupler and configured to receive refueling information from a second transceiver located at the tanker aircraft, and in communication with the one or more sensors to send the status of refueling to the first transceiver for feedback to the tanker aircraft, a plurality of light sources located at the refueling coupler, and a processor in communication with the first transceiver to receive the refueling information, in communication with the one or more sensors to receive the feedback regarding the status of refueling, and in communication with the plurality of light sources to operate the plurality of light sources in a plurality of visual indications based on the refueling information and the status of refueling.

In another example, a method for providing indications to a receiver aircraft during a refueling operation using an indication system of a refueling system is described. The refueling system includes a hose for supplying fuel from a tanker aircraft to a receiver aircraft and a refueling coupler coupled to an end of the hose. The method includes receiving, at a first transceiver located at the refueling coupler, refueling information from a second transceiver located at the tanker aircraft, and operating a plurality of light sources located at the refueling coupler based on the refueling information.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, a refueling coupler provided at an end of a refueling hose includes a lighting system or indication system that is capable of replicating information displayed at the tanker aircraft and on the hose line for view by a pilot of the receiver aircraft being refueled. The lights in the refueling coupler can be used to relay information including a location and status of the refueling coupler, and also a distance of the refueling coupler from the tanker aircraft, which is related to whether the receiver aircraft is within a fuel transfer zone (based on a length of the hose extended from the tanker aircraft and a status of a refueling system at the tanker aircraft). While, the exemplary embodiments are described with respect to aerial refueling, it should be realized that the systems and methods described herein may also be utilized with other types of vehicles such as ships, barges, locomotives, automobiles, etc.

The indication system can duplicate information that is available on the tanker aircraft and information provided by markings on the fuel hose so that the pilot of the receiver aircraft only needs to focus on a single point in flight to receive all required information to successfully refuel the receiver aircraft.

Example methods thus enable signaling to a pilot of the receiver aircraft directly at the refueling coupler via a wireless connection and lighting. The indication system described herein enables improved pilot situational awareness during low light conditions (e.g., night refueling, turning while coupled). During a known refueling operation, the pilot of the refueling aircraft relies on index markings on the hose that can be difficult to see. But, with examples described herein, providing a status directly on the refueling coupler reduces pilot workload and allows the pilot of the receiver aircraft to focus on a single point in flight.

Figure 1:
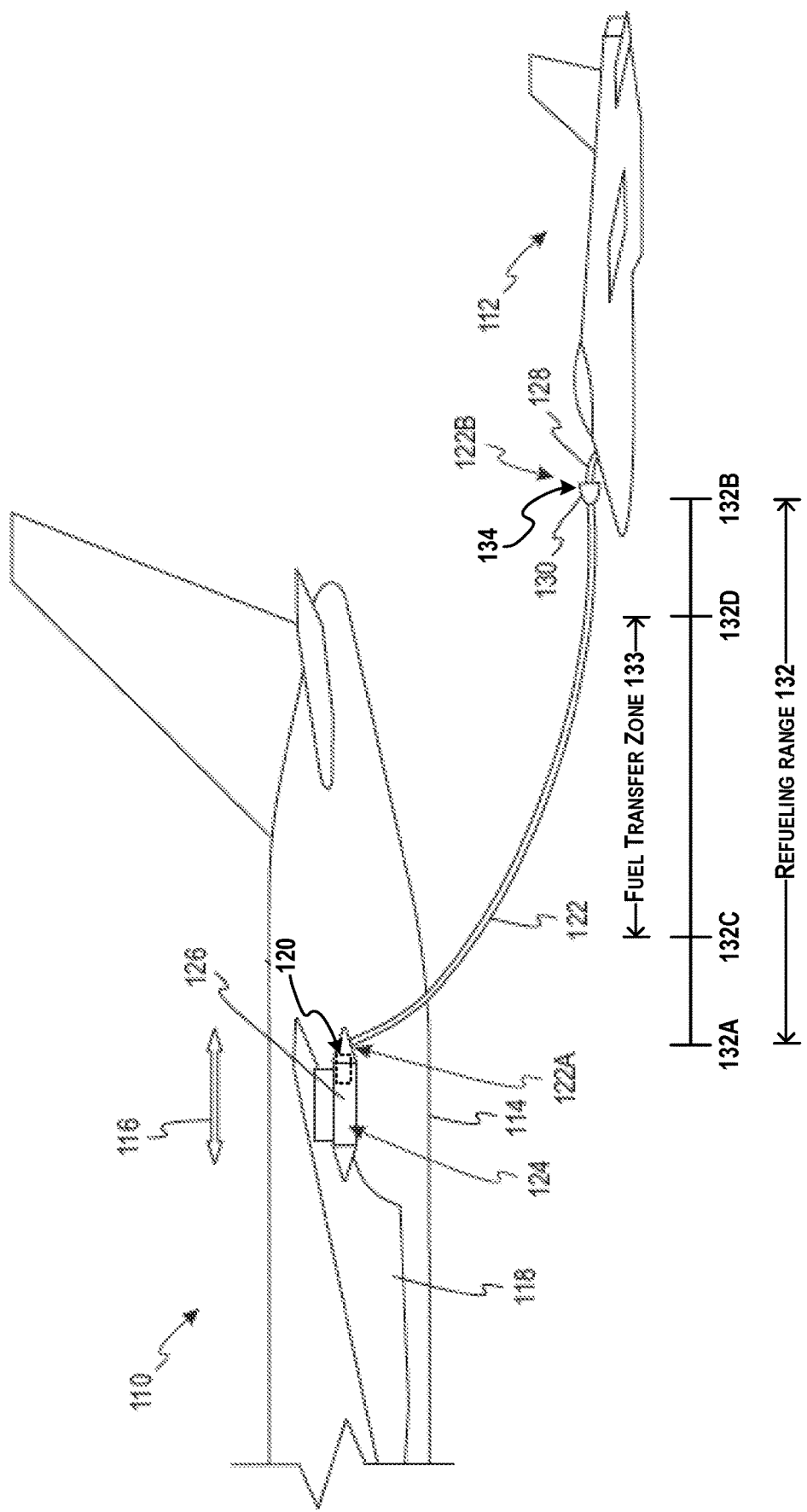
FIG. 1 depicts a partial side view of a tanker aircraft and a receiver aircraft during an aerial refueling operation, according to an example implementation.

Referring now to the figures, FIG. 1 depicts a partial side view of a tanker aircraft 110 and a receiver aircraft 112 during an aerial refueling operation, according to an example implementation. As shown in FIG. 1, the tanker aircraft 110 includes a fuselage 114 that extends in a longitudinal direction 116 and a pair of wings 118 that extend from the fuselage 114 in a transverse direction relative to the longitudinal direction 116. The tanker aircraft 110 also includes a refueling system 120 that is operable to refuel the receiver aircraft 112 in-flight. The refueling system 120, which is shown in more detail in FIG. 2, includes a flexible hose 122 that extends from a housing 124 and is movable relative to the housing 124.

In FIG. 1, the housing 124 is a pod 126, which is coupled to one of the aircraft wings 118. Although FIG. 1 depicts a single pod 126, the tanker aircraft 110 can include one or more pods 126 with a pod 126 being installed on each wing 118 in additional or alternative examples. By providing a pod 126 on each of the wings 118, the tanker aircraft 110 can refuel multiple receiver aircraft 112 at the same time. Additionally or alternatively, the housing 124 from which the hose 122 extends can be provided by a lower portion of the fuselage 114 in other examples.

The hose 122 is configured to supply fuel to the receiver aircraft 112. For example, the hose 122 includes (i) a first end 122A in the housing 124 for receiving the fuel from a fuel tank in the tanker aircraft 110 and (ii) a second end 122B. The second end 122B includes a refueling coupler 130 (which may be referred to as a drogue) that has a conical shape to assist in stabilizing the hose 122 during flight and coupling the hose 122 with a probe 128 of the receiver aircraft 112. In operation, the hose 122 is configured to trail below and aft of the tanker aircraft 110 for coupling with the probe 128 of the receiver aircraft 112

In FIG. 1, the receiver aircraft 112 is in a position that is below and aft of a rear portion of the fuselage 114 of the tanker aircraft 110 to couple to the refueling coupler 130 of the hose 122. This may mitigate or avoid potentially dangerous turbulence and disturbances in air flow created by, for instance, control surfaces and engines of the tanker aircraft 110.

Additionally, FIG. 1 illustrates a refueling range 132 of the refueling system 120. The refueling range 132 is defined between a first-boundary position 132A and a second-boundary position 132B. The first boundary position 132A represents a point where the hose 122 and refueling coupler 130 are fully retracted into the tanker aircraft 110, (e.g. in a stowed position) The second boundary position 132B represents a point where the hose 122 is fully extended from the tanker aircraft 110, referred to as the full trail position. The full trail position is typically a maximum hose length that is extendable from the tanker aircraft 110.

FIG. 1 also illustrates a fuel transfer zone 133 that is defined between points 132C and 132D. The fuel transfer zone 133 represents an area wherein the tanker aircraft 110 is configured to transfer fuel to the receiver aircraft 112. In operation, when the receiver aircraft 112 is within the fuel transfer zone 133, as measured by aerial refueling system hose reel control electronics (described in FIG. 2), fuel is enabled to be transferred if the receiving aircraft 112 is engaged with the refueling coupler 130. More specifically, when the receiver aircraft 112 is within the fuel transfer zone 133, the refueling system 120 can supply fuel to the receiver aircraft 112. The refueling system 120 may not supply fuel to the receiver aircraft 112 when the receiver aircraft 112 is outside of the fuel transfer zone 133. The receiver aircraft 112 may be considered to be in the fuel transfer zone 13 when at least the probe 128 of the receiver aircraft 112 is within the fuel transfer zone 133 and past point 132D, for example. In one example, the fuel transfer zone 133 spans a distance of approximately 50-70 feet. In other examples, the fuel transfer zone 133 may be shorter or longer depending on a size of the aircraft providing fuel, a size of the aircraft being refueled, and/or a length of the refueling hose 122.

The refueling system 120 also includes an indication system 134 for providing indications to the receiver aircraft 112 relating to the aerial refueling operation. A portion of the indication system 134 is located at the refueling coupler 130 and another portion of the indication system 134 is located in the tanker aircraft 110 as described in more detail below. The indication system 134 is configured to provide visual indications to the receiver aircraft 112 representative of information useful or needed by a pilot of the receiver aircraft 112 for refueling operations.

Figure 2:
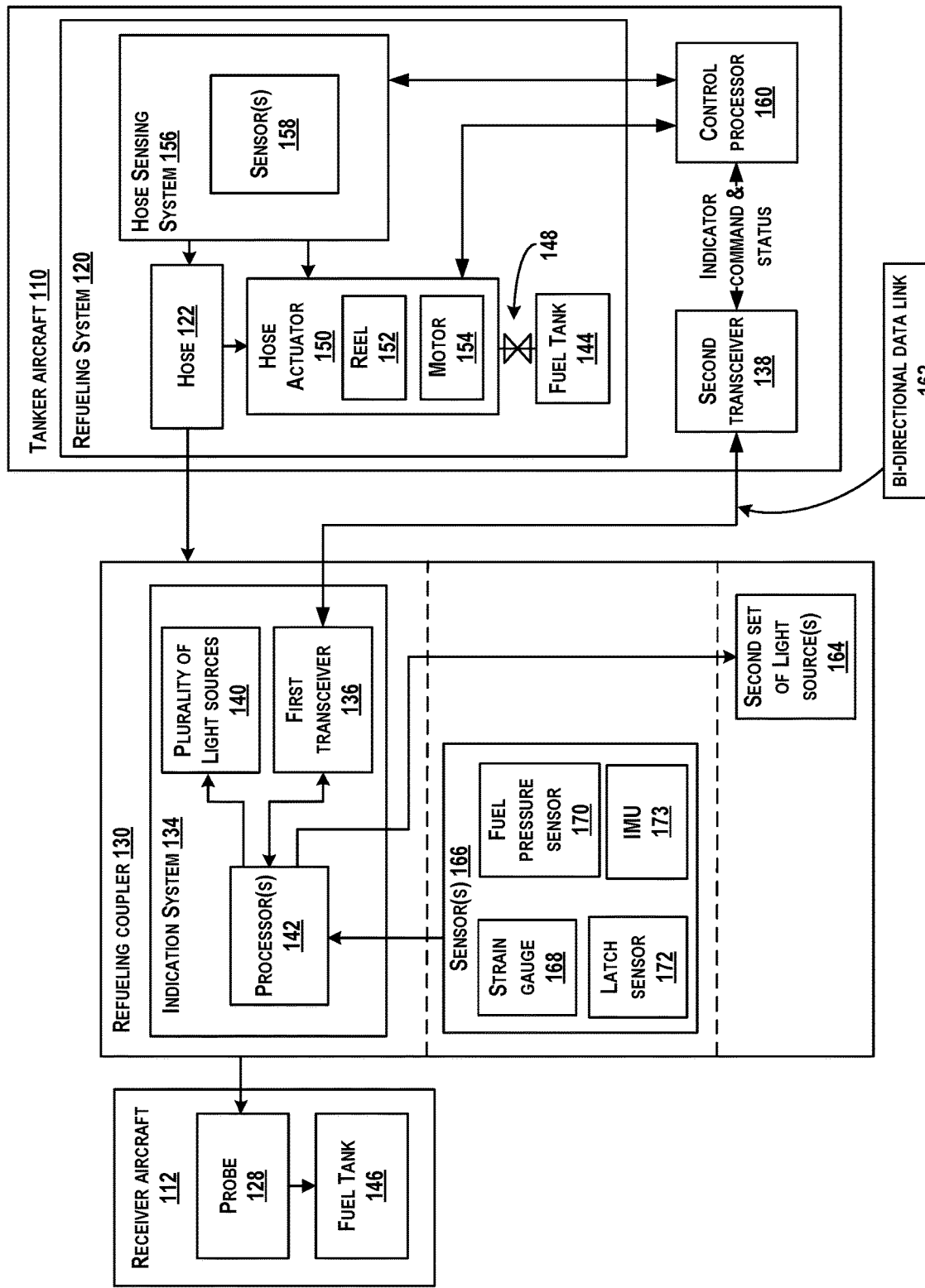
FIG. 2 depicts a block diagram of the tanker aircraft and the receiver aircraft configured for an aerial refueling operation, according to an example implementation.

FIG. 2 depicts a block diagram of the tanker aircraft 110 and the receiver aircraft 112 configured for an aerial refueling operation, according to an example implementation. In the exemplary embodiment, the indication system 134 includes a first transceiver 136 located at the refueling coupler 130 and a second transceiver 138 located at the tanker aircraft 110. In operation, the first transceiver 136 is configured to transmit and receive refueling information from the second transceiver 138. Moreover, the second transceiver 138 is configured to transmit and receive refueling information from the first transceiver 136. The indication system 134 also includes a plurality of light sources 140 and a processor 142 both located at the refueling coupler 130. In operation, the processor 142 is in communication with the first transceiver 136 to receive the refueling information, and in communication with the plurality of light sources 140 to operate the plurality of light sources 140 based on the refueling information. Example visual indications provided by the plurality of light sources 140 based on different types of refueling information are shown in FIGS. 3-8, as described below.

Although only one processor is shown, the indication system 134 may include more than one processor. In addition, the processor 142 may include or have access to a non-transitory computer readable medium (e.g., volatile and/or non-volatile memory) that stores machine language instructions or other executable instructions. The instructions, when executed by the processor 142, cause the indication system 134 to carry out the various operations described herein.

The plurality of light sources 140 includes multiple light sources of any type including light emitting diodes (LEDs), incandescent bulbs, LED bulbs, digital displays, etc. The plurality of light sources 140 may include multi-color light sources, or light sources of multiple colors. The plurality of light sources 140 can also include normal and/or covert lighting. An example of normal lighting includes light sources that emanate light visible by the naked eye, and may be unfiltered light that emanates in all directions. Examples of covert lighting include infrared (IR) lights or light sources that are filtered so that light emanated by the light sources is not visible to the naked eye entirely or not visible to the naked eye beyond a threshold distance (e.g., such as approximately 20 to 30 feet). Covert lighting may be used to provide illumination in a focused and directed manner.

The plurality of light sources 140 are operated by the processor 142 to generate a visual indication based on the refueling information received by the processor 142. The refueling information can include many pieces of data including a length of the hose 122 deployed during refueling operations as received from the second transceiver 138 located at the tanker aircraft 110, a status of refueling, and outputs from sensor(s) 166 which are described in more detail below.

The refueling system 120 further includes a fuel tank 144, a motorized hose actuator 150, and one or more valve(s) 148 disposed between the fuel tank 144 and the hose actuator 150. The valve(s) 148 are operable to start and stop the flow of fuel, and/or to increase and decrease a pressure of fuel flow through the hose 122. The hose actuator 150 includes a rotatable hose reel 152 configured to stow the hose 122 and a motor 154 configured to rotate the hose reel 152 to enable the hose to be extended from or retracted into the tanker aircraft 110. The hose actuator 150 moves the hose 122 relative to the housing 124 to extend the hose 122 from the housing 124 (and/or retract the hose 122 into the housing 124 after completion of refueling). The hose actuator 150 operates the motor 154 to rotate the reel 152 on which the hose 122 is wound to extend and retract the hose 122. The reel 152 can be mounted within the housing 124 of the pod 126 and/or the housing 124 in the fuselage 114 of the tanker aircraft 110. The hose actuator 150 is configured to control a position of the hose 122 relative to the housing 124 by controlling the length of hose 122 that is being extended from the housing 124.

The refueling system 120 also includes a hose sensing system 156 including sensor(s) 158, and a control processor 160. In operation, the hose sensing system 156 is configured to (i) sense a condition of the hose 122 and (ii) generate, based on the sensed condition, refueling information for transmission from the second transceiver 138 to the first transceiver 136. To sense the condition, the hose sensing system 156 includes the one or more sensors 158. In an example, the condition sensed by the sensor(s) 158 can include (i) a length of the hose 122 deployed, (ii) whether the hose 122 is supplying fuel from the tanker aircraft 110 to the receiver aircraft 112, (iii) a pressure of the fuel supplied by the hose 122 to the receiver aircraft 112, (iv) a position of the hose 122 relative to the housing 124, (v) a change in the position of the hose 122 responsive to a change in the position of the receiver aircraft 112, and/or (vi) a tension on the hose 122 when the hose 122 is coupled to the probe 128 of the receiver aircraft 112.

The control processor 160 is in communication with the hose actuator 150 and the hose sensing system 156 of the refueling system 120. The control processor 160 receives the refueling information (e.g., information about a length of the hose 122 deployed during refueling) from the hose sensing system 156 and/or from the hose actuator 150, and causes the second transceiver 138 to send the refueling information to the first transceiver 136. The first transceiver 136 receives the refueling information from the second transceiver 138 and the plurality of light sources 140 are operated by the processor 142 to generate a visual indication based on the refueling information received at the first transceiver 136.

Within examples, the second transceiver 138 can send, and the first transceiver 136 can receive, refueling information over a bi-directional data link 162. The bi-directional data link 162 may be a wireless data link, and thus, the first transceiver 136 and the second transceiver 138 may include hardware for transmitting and receiving wireless information (e.g., antennas). In other examples, the bi-directional data link 162 may be a wired data link in which a wire may connect the first transceiver 136 and the second transceiver 138. In this example, a wire may run along the hose 122 and connect to the first transceiver 136 through the refueling coupler 130. For a wired connection, communication between the first transceiver 136 and the second transceiver 138 occurs upon connection of the probe 128 to the refueling coupler 130, for example.

In the exemplary embodiment, the indication system 134 also includes or is in communication with a second set of light sources 164 configured to illuminate an interior of the refueling coupler 130. The plurality of light sources 140 are positioned on a peripheral region of the refueling coupler 130, and the second set of light sources 164 are positioned in the interior of the refueling coupler 130. In this manner, the plurality of light sources 140 are operated by the processor 142 to indicate the visual indications representative of the refueling information. Moreover, the second set of light sources 164 are operated by the processor 142 (or by the refueling system 120 of the tanker aircraft 110) to illuminate the interior of the refueling coupler 130 which enables the pilot of the receiver aircraft 112 to more easily maneuver the probe 128 into engagement with the refueling coupler 130 during nighttime or low-light conditions. The second set of light sources 164 act as a backlight for the refueling coupler 130, and are located in the interior of the refueling coupler 130 where the probe 128 engages the refueling coupler 130. Once the probe 128 is engaged with the refueling coupler 130, the second set of light sources 164 may be obscured. Thus, the plurality of light sources 140 are used to provide the visual indications of the refueling information.

In another exemplary embodiment, the indication system 134 further includes or is in communication with one or more sensors 166, such as a strain gauge 168, a fuel pressure sensor 170, a latch sensor 172, and an inertial measurement unit (IMU) 173, located at the refueling coupler 130 to provide feedback regarding a status of refueling. Although, only one strain gauge, fuel pressure sensor 170, latch sensor 172, and IMU 173 are shown, more or fewer sensors may be included, and multiples of each sensor can also be included, for example.

The one or more sensor(s) 166 output data to the processor 142, which uses the data to operate the plurality of light sources 140 to generate visual indications. Thus, the processor 142 operates the plurality of light sources 140 in different visual indications or patterns where each pattern is associated with a sensor output or information received from the tanker aircraft 110.

The processor 142 also communicates the output data of the sensor(s) 166 to the first transceiver 136, which transmits the output data from the refueling coupler 130 to the second transceiver 138 at the tanker aircraft 110 to provide the status of refueling to the operator of the tanker aircraft 110.

The sensor(s) 166 detect conditions prior to, and during, the refueling operation. For example, the strain gauge 168 detects the structural loading on the refueling coupler 130 contact surfaces due to physical contact with the probe 128 at and during engagement. The strain gauge can further determine that a force of the contact is within an allowable limit. The measured loads on the refueling coupler 130 are then used to estimate the loads experienced at the probe 128 during the refueling process. The results of the estimate, as measured by the strain gauge 168, are then output to the processor 142.

The fuel pressure sensor 170 is in the fluid flow path, and can detect a pressure of the fuel being transferred from the tanker aircraft 110 to the receiver aircraft 112 and outputs a signal to the processor 142. The latch sensor 172 detects that the refueling coupler 130 has engaged with the receiver aircraft 112 and outputs a signal to the processor 142 and the transceivers 136/138 to inform both aircraft that the probe is positively coupled to the refueling coupler 130 and ready to receive fuel. The IMU 173 determines or measures a location of the receiver aircraft 112 once coupled to the refueling coupler 130, and outputs the location to the processor 142. The information from the IMU 173 indicating refueling coupler 130 movements can also be used to determine the stability of refueling coupler 130 which supports the probe engagement initiation decision making process. The IMU 173 also provides the initial refueling coupler 130 location at full trail (i.e., position 132B) based on the catenary of the hose 122. Identifying the location of the refueling coupler 130 and the catenary of the hose 122 improves the disconnect operation by enabling the receiver aircraft 112 to perform the disconnect at the same location (i.e., "leave the refueling coupler 130 where you found it"), whereas disconnecting at a highly deviated position may result in the refueling coupler 130 swinging back and forth in an unpredictable manner.

In operation, the processor 142 receives the refueling information from the first transceiver 136 (which receives information transmitted from the second transceiver 138 located at the tanker aircraft 110) and/or from the sensor(s) 166, and operates the plurality of light sources 140 in a plurality of visual indications. A visual indication may be a specific pattern of lights on/off, a specific pattern of different colored lights on/off, and/or lights operating at different frequencies (blinking), etc. In one example, the plurality of light sources 140 include a plurality of colored light emitting diodes, and the processor 142 operates the plurality of light sources 140 to generate a plurality of visual indications having different colors.

The visual indications can also include different intensities of the plurality of light sources 140 (e.g., a bright setting and a dim setting). The lighting intensity can be controllable via the bi-directional data link 162 based on a pilot request to the tanker aircraft 110. Additionally, an automatic or manual adjustment of the light intensity can be performed based on ambient lighting conditions (e.g., brighter in direct daylight and dimmer in low light). Still further, the visual indications can include any combination of operation of the plurality of light sources 140 as described, including different colors, frequency, intensity, normal and covert, etc.

The processor 142 receives the refueling information, and responsively activates at least one of the plurality of light sources 140 to generate the visual indication. The processor 142 can be configured to select, based on the refueling information, the specific light sources of the plurality of light sources 140 for illumination, for example.

In one example, the processor 142 operates the plurality of light sources 140 in the plurality of visual indications to indicate various different indications, and example indications include a refueling coupler engaged indication, a refueling coupler disengaged indication, a tanker refueling system not ready indication, a refueling system ready indication, an engaged and latched indication, a receiver aircraft connected and inside a fuel transfer zone (FTZ) but no fuel flow indication, a receiver aircraft connected and inside the FTZ with fuel transfer indication, an emergency separation indication, a receiver aircraft connected but too close to the tanker aircraft and outside of the FTZ indication, and a receiver aircraft connected but too far from the tanker aircraft and outside of the FTZ indication. Specific patterns of lights being on/off and/or being illuminated in a specific color can be assigned to each different indication so that the pilot of the receiver aircraft 112 can determine the information being communicated.

Various different types and amount of data can be included in the refueling information, and thus, various different visual indications may be generated. In any of the examples described to generate the visual indications, light sources of the plurality of light sources 140 can be operated independently, or in groups, in order to generate the desired visual indication.

Figure 3:
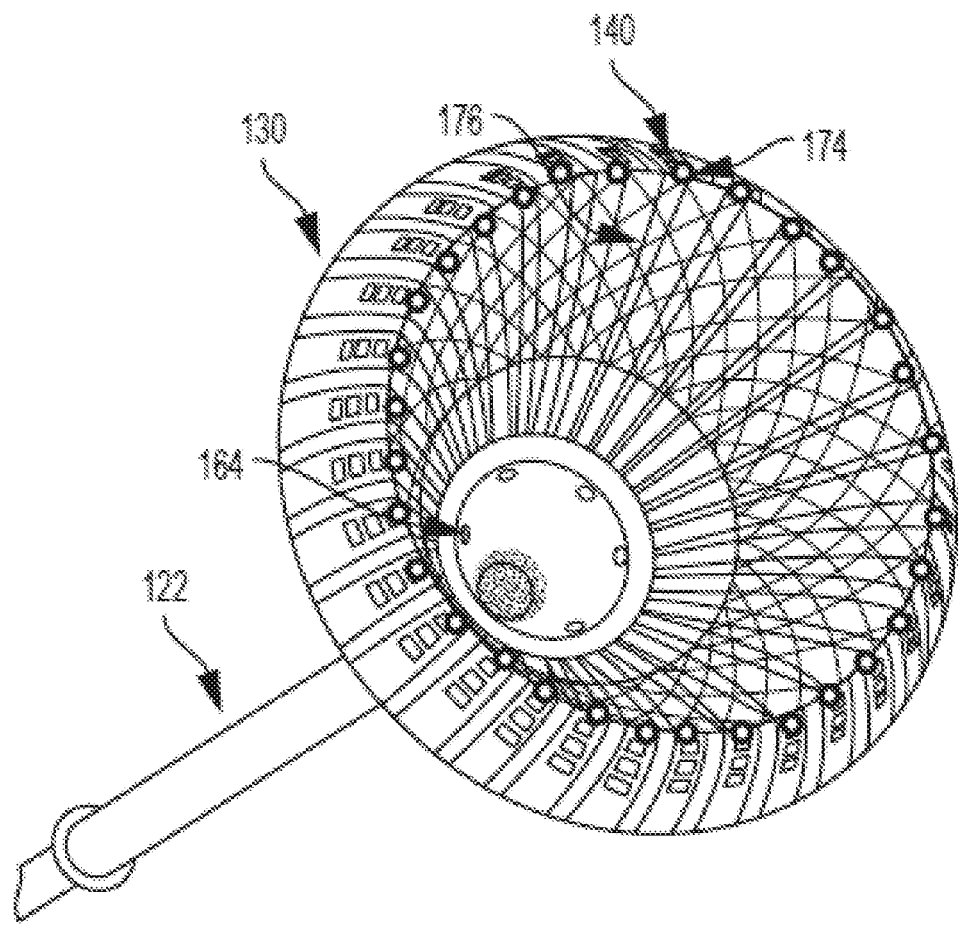
FIG. 3 depicts an arrangement of the plurality of light sources on the refueling coupler, according to an example implementation.

FIG. 3 depicts an arrangement of the plurality of light sources 140 on the refueling coupler 130, according to example implementations. In FIG. 3, the plurality of light sources 140 are shown arranged on a peripheral region of the refueling coupler 130 and the second set of light sources 164 are located at an interior position inside the refueling coupler 130. For example, the refueling coupler 130 is shown as a basket with a circular peripheral region, and the plurality of light sources 140 are arranged around the circle at nodes, such as node 174, along the circle that extends from support structures, such as support structure 176. Although FIG. 3 illustrates a light source at all of the nodes of each support structure, fewer or more light sources may be included. In FIG. 3, an example visual indication can include the plurality of light sources 140 illuminated in a bright intensity and at a specific color, for example, to provide a visual indication (or visual pattern) of the received refueling information.

FIGS. 4-10 depict example aerial refueling operations and corresponding example visual indications generated by the plurality of light sources 140 during the refueling operations.

Figure 4:
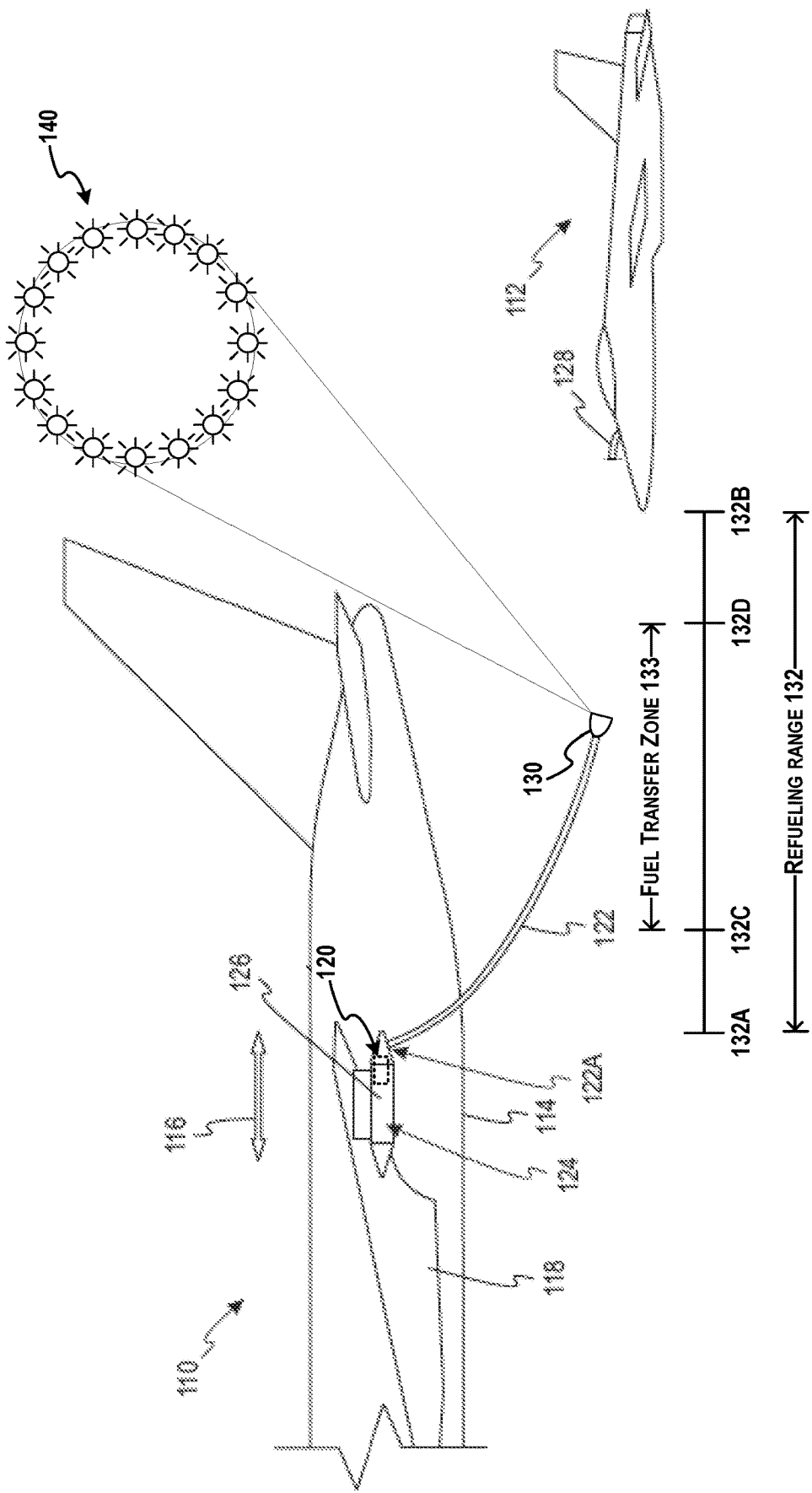
FIG. 4 depicts an example aerial refueling operation and corresponding example visual indication generated by the plurality of light sources during the refueling operation, according to an example implementation.

FIG. 4 illustrates an example aerial refueling operation beginning with the tanker aircraft 110 initially extending the hose 122 and the refueling coupler 130 from the housing 124. Due to aerodynamic forces, the hose 122 and the refueling coupler 130 trail behind the tanker aircraft 110 below and aft of the fuselage 114. While initially extending the hose 122 and/or otherwise preparing the refueling system 120, the hose sensing system 156 can sense the condition(s) of the hose 122, which results in generating refueling information indicating that the refueling system 120 is not ready to couple with the receiver aircraft 112. For example, the not ready state results from the hose 122 not being in a position fully extended to position 132B in the refueling range 132 (e.g., while the hose 122 is initially extended from the housing 124).

The hose sensing system 156 senses the condition(s) of the hose 122, generates the refueling information based on the sensed condition(s), and communicates the refueling information to the control processor 160. The control processor 160 sends the information (indicator command and status) to the second transceiver 138, which transmits the information to the first transceiver 136 at the refueling coupler 130. Accordingly, the processor 142 operates the plurality of light sources 140 based on the received refueling information to be a predefined color (e.g., red) and at a predefined intensity setting (e.g., bright setting) so as to indicate that the refueling system 120 is not ready to couple with the receiver aircraft 112. An example of such a visual indication is shown in FIG. 4. A pilot of the receiver aircraft 112 can view the visual indication of red lights on the refueling coupler 130, and responsively does not attempt to couple with the tanker aircraft 110.

In another example, the refueling system 120 may be placed in a not ready state by the aerial refueling operator (ARO) of the tanker aircraft 110 due to an incomplete reel out/in state, or based on any anomalies reported by the sensors 166 on the refueling coupler 130. Other examples are also possible.

Figure 5:
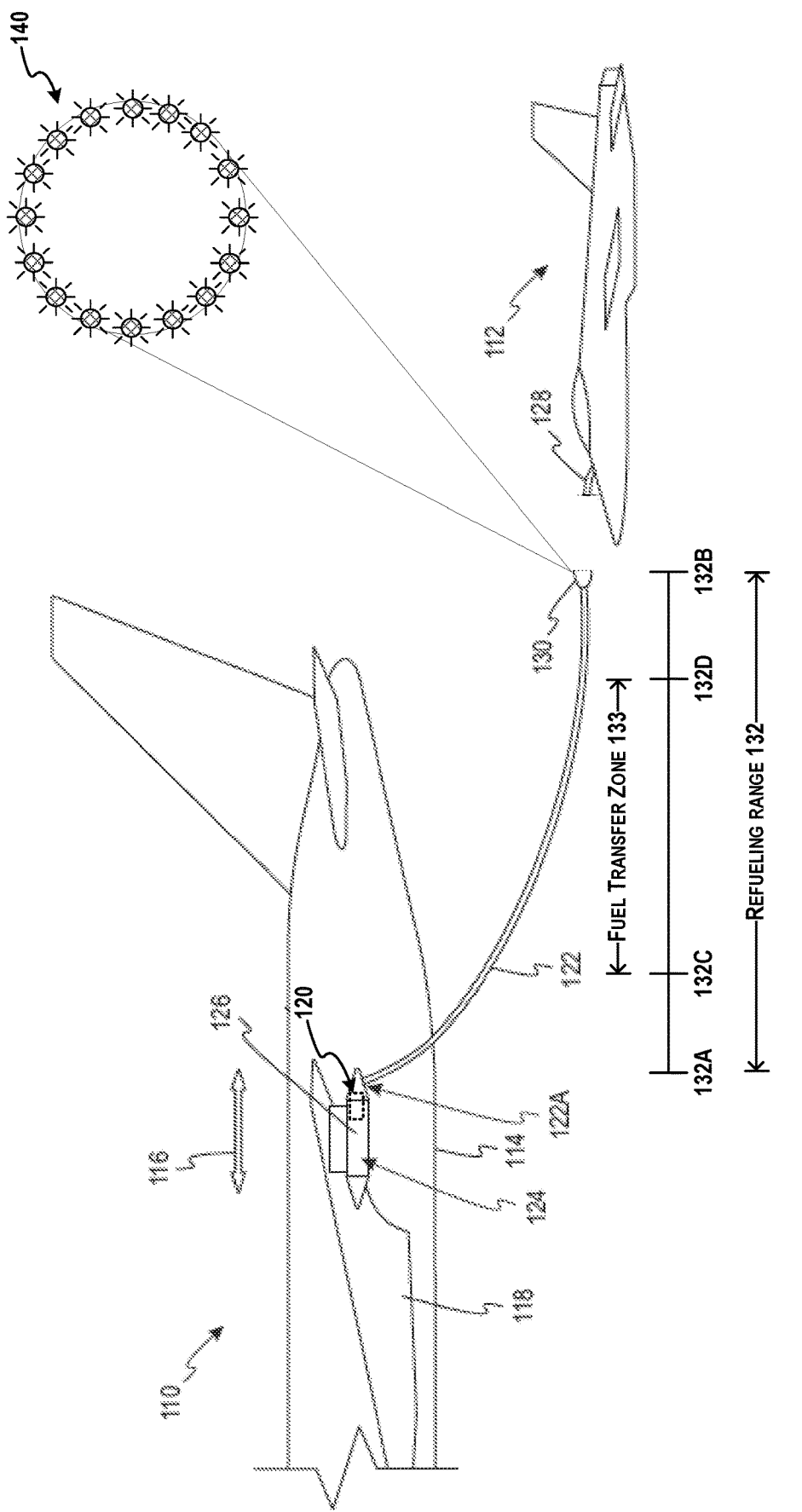
FIG. 5 depicts another example aerial refueling operation and corresponding example visual indication generated by the plurality of light sources during the refueling operation, according to an example implementation.

Next, as shown in FIG. 5, the hose actuator 150 completes extending the hose 122 and the refueling coupler 130 to a fully extended position 132B (e.g., full trail position) of the refueling range 132 at which point the refueling system 120 is ready to couple to the receiver aircraft 112. Thus, the hose sensing system 156 senses these conditions, generates the refueling information based on the sensed conditions, and communicates the refueling information to the control processor 160. In this example, the refueling information includes a length of the hose 122 that has been deployed. The control processor 160 can determine a length of the hose 122 that has been deployed based on outputs from the hose sensing system 156, for example, which may monitor the reel 152 and the motor 154 of the hose actuator 150 during deployment. The reel 152 stores the hose 122 in a stowed position, as the hose is deployed, the reel 152 turns, and the hose sensing system 156 can measure a number of turns/rotations of the reel 152 to determine the length of the hose 122 deployed. The length of the portion of hose 122 that is extended from the tanker aircraft 110 may be 75 feet, and an acceptable refueling range can be established once the hose 122 has been deployed between about 50-70 feet.

The control processor 160 sends the refueling information including the length of the hose 122 deployed to the second transceiver 138, which transmits the refueling information to the first transceiver 136 at the refueling coupler 130. Accordingly, the processor 142 operates the plurality of light sources 140, based on the length of the hose 122 deployed satisfying the refueling range 132 and extending to the full trail position, to be at a bright setting and a different color (such as yellow), as conceptually shown in FIG. 5. Thus, the plurality of light sources 140 are set at a predefined pattern to inform the pilot of the receiver aircraft 112 that he can approach and couple to the refueling coupler 130.

Figure 6:
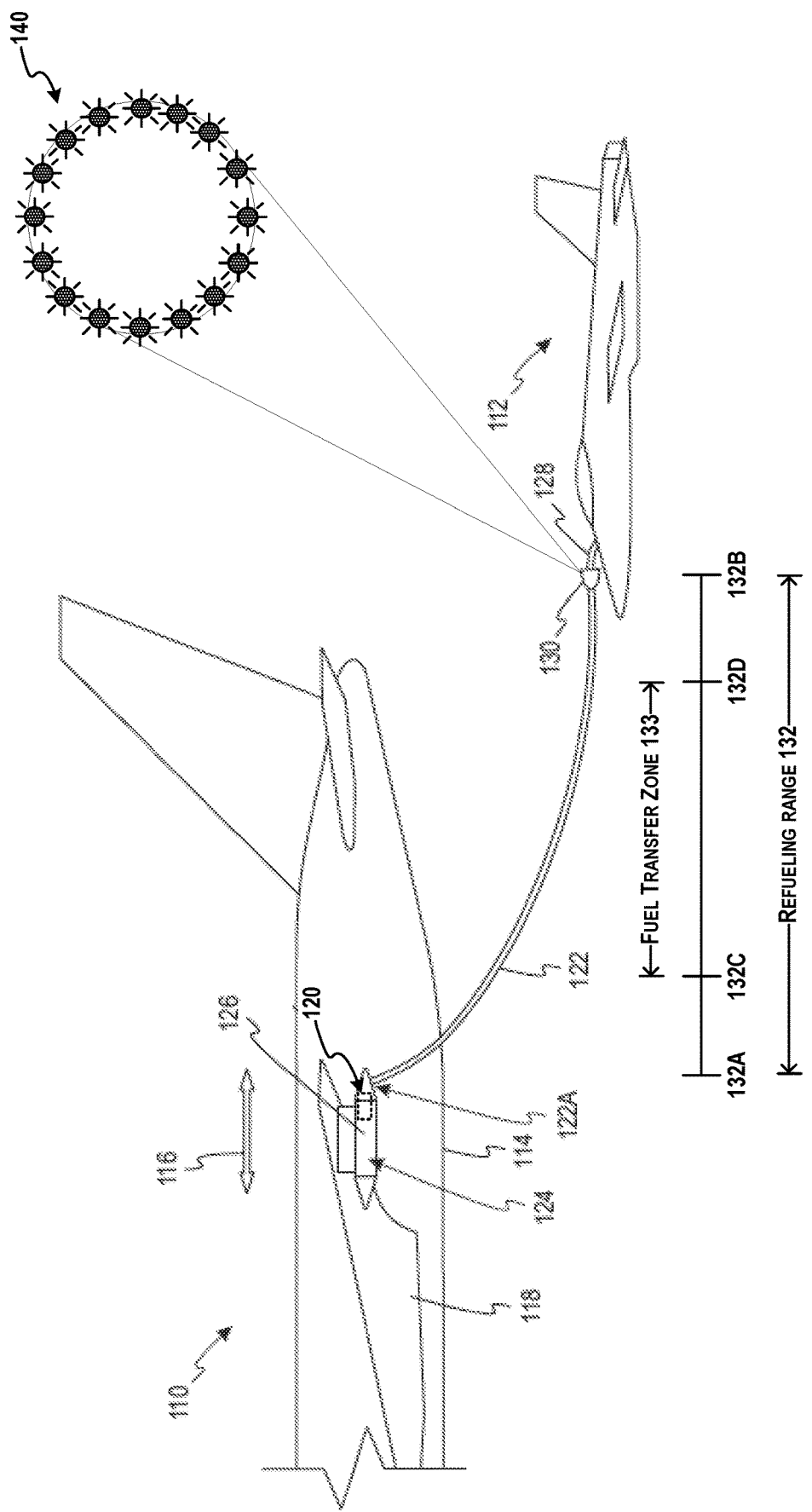
FIG. 6 depicts another example aerial refueling operation and corresponding example visual indication generated by the plurality of light sources during the refueling operation, according to an example implementation.

Responsive to this indication, the receiver aircraft 112 maneuvers into a position to enable the probe 128 to engage with the refueling coupler 130, as shown in FIG. 6. In operation, once the probe 128 contacts the refueling coupler 130, the strain gauge 168 detects the contact and outputs a signal to the processor 142. In addition, the latch sensor 172 detects that the refueling coupler 130 has engaged with the receiver aircraft 112 and outputs a signal to the processor 142. Further, the IMU 173 determines or measures a location of the receiver aircraft 112 once coupled to the refueling coupler 130, and outputs the location to the processor 142. The processor 142 can then operate the plurality of light sources 140 to provide a visual indication to a pilot of the receiver aircraft 112 to indicate that the probe 128 has engaged with the refueling coupler 130 based on any of these received signals. An example visual indication of the refueling coupler engagement may include a dim setting at yet a different color (such as green), as conceptually shown in FIG. 6.

Figure 7:
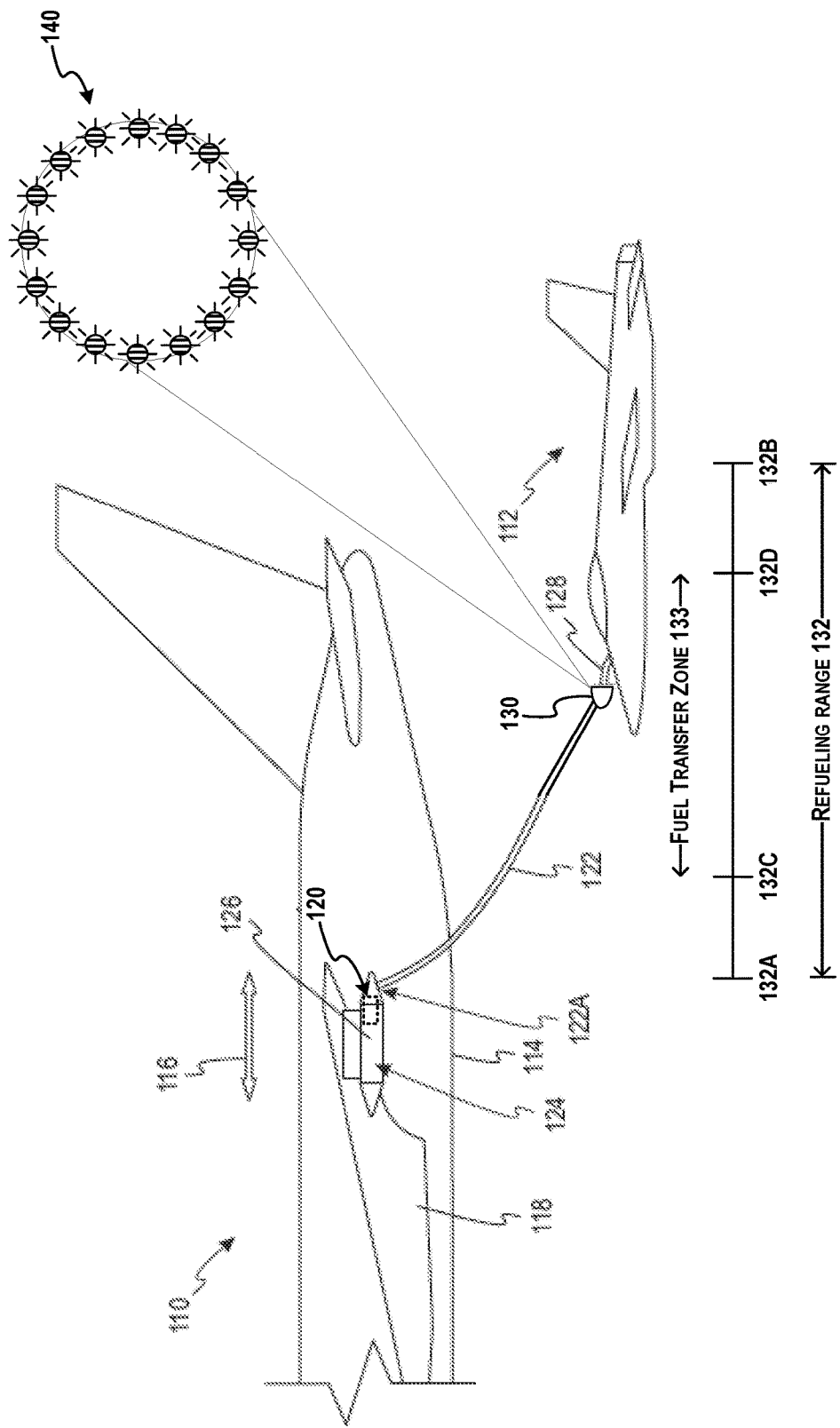
FIG. 7 depicts another example aerial refueling operation and corresponding example visual indication generated by the plurality of light sources during the refueling operation, according to an example implementation.

After the probe 128 is coupled to the refueling coupler 130, the receiver aircraft 112 can continue to urge the refueling coupler 130, and thus the hose 122, forward toward the tanker aircraft 110 until the receiver aircraft 112, and more particularly the refueling coupler 130, is in the fuel transfer zone 133. For example, as shown in FIG. 7, after the receiver aircraft 112 is coupled to the refueling coupler 130, the receiver aircraft 112 pushes the refueling coupler 130 past point 132D into the fuel transfer zone 133. While the refueling coupler 130 is inside the fuel transfer zone 133, the receiver aircraft 112 can receive fuel, whereas while the refueling coupler 130 is outside the fuel transfer zone 133, the receiver aircraft 112 cannot receive fuel.

The hose reel 152 maintains tension on the hose 122 to reduce slack as the receiver aircraft 112 pushes the refueling coupler 130 into the fuel transfer zone 133. The tension is measured as is the length of the hose 122 being extended during refueling by the sensors 158, for example. The control processor 160 sends the refueling information including the length of the hose 122 deployed to the second transceiver 138, which transmits the refueling information to the first transceiver 136 at the refueling coupler 130. Accordingly, the processor 142 operates the plurality of light sources 140 based on the length of the hose 122 deployed indicating that the receiver aircraft 112 is in the fuel transfer zone 133, to be at a predefined pattern to inform the pilot of the receiver aircraft 112 that the receiver aircraft 112 is in the fuel transfer zone 133. An example predefined pattern to inform that the receiver aircraft 112 is in the fuel transfer zone 133 is shown in FIG. 7.

If the receiver aircraft 112 starts to drift somewhat during the refueling operation, such that the receiver aircraft 112 is approaching the distal limit of the fuel transfer zone, i.e. point 132D, the indication system 134 is configured to generate a visual indication. More specifically, as a distance between the receiver aircraft 112 and the tanker aircraft 110 increases, the length of the portion of hose 122 that is being extended from the tanker aircraft 110 also increases. Conversely, as a distance between the receiver aircraft 112 and the tanker aircraft 110 decreases, the length of the portion of hose 122 that is being extended from the tanker aircraft 110 also decreases. Accordingly, the processor 142 receives information indicative of the length of the hose being extended from the tanker aircraft 110, and determines, in real-time, whether the receiver aircraft 112 is moving in a direction that may result in the receiving aircraft 112 exiting the fuel transfer zone 133. As a result, the processor operates the plurality of light sources 140 to provide a different visual indication to inform the pilot of the receiver aircraft 112 to move inward toward the tanker aircraft 110 such that the receiver aircraft is maintained within the fuel transfer zone 133.

Figure 8:
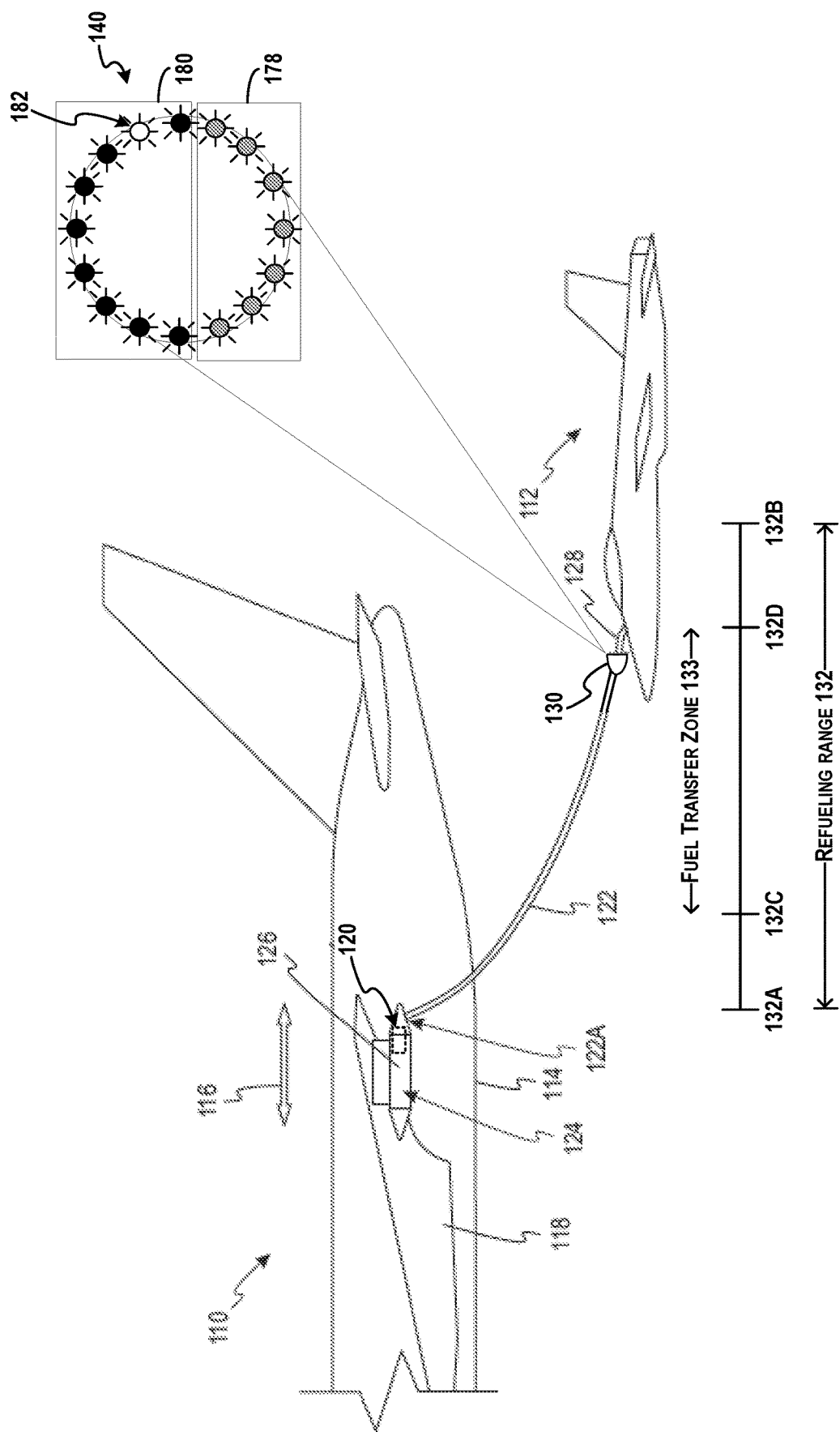
FIG. 8 depicts another example aerial refueling operation and corresponding example visual indication generated by the plurality of light sources during the refueling operation, according to an example implementation.
Figure 9:
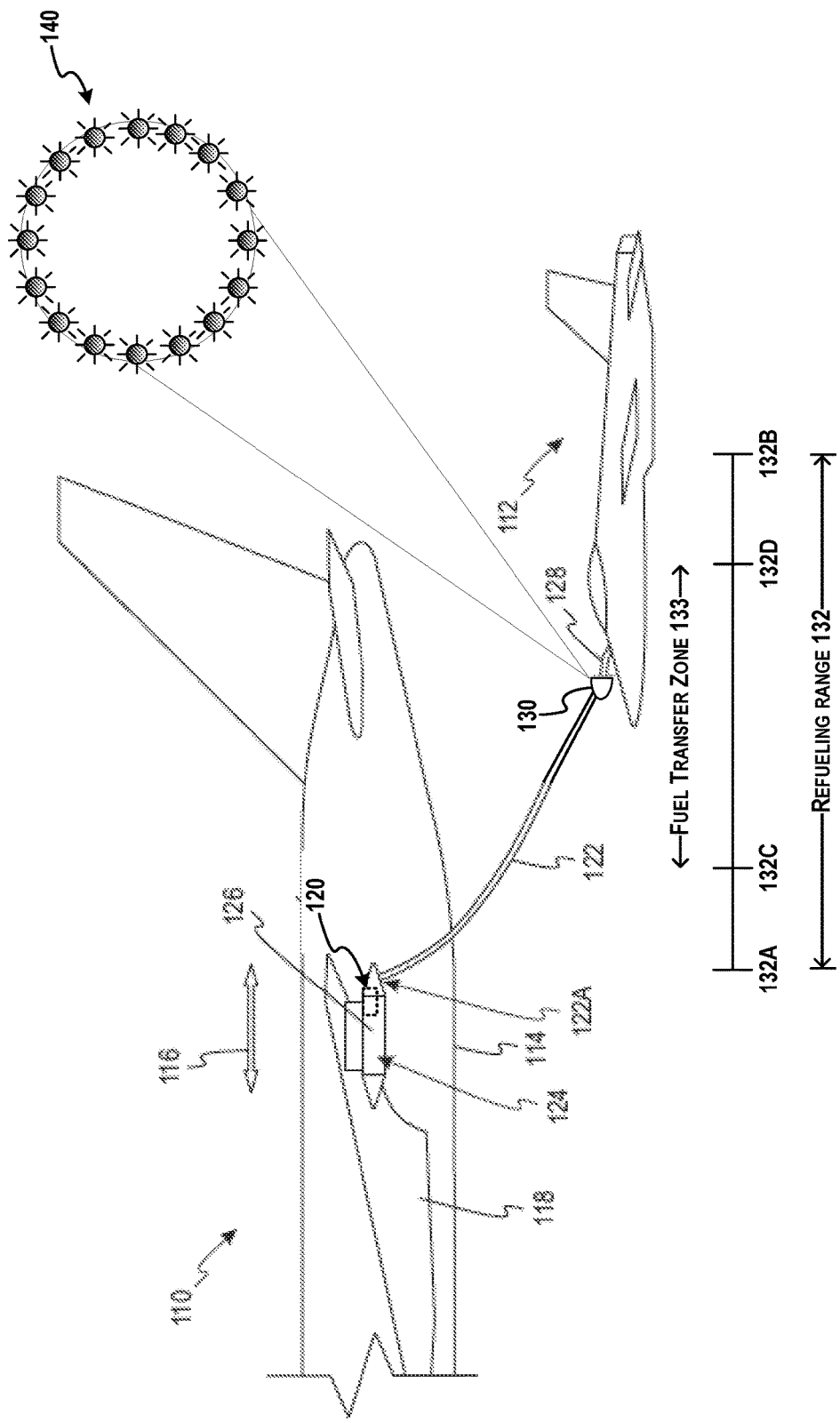
FIG. 9 depicts another example aerial refueling operation and corresponding example visual indication generated by the plurality of light sources during the refueling operation, according to an example implementation.
Figure 10:
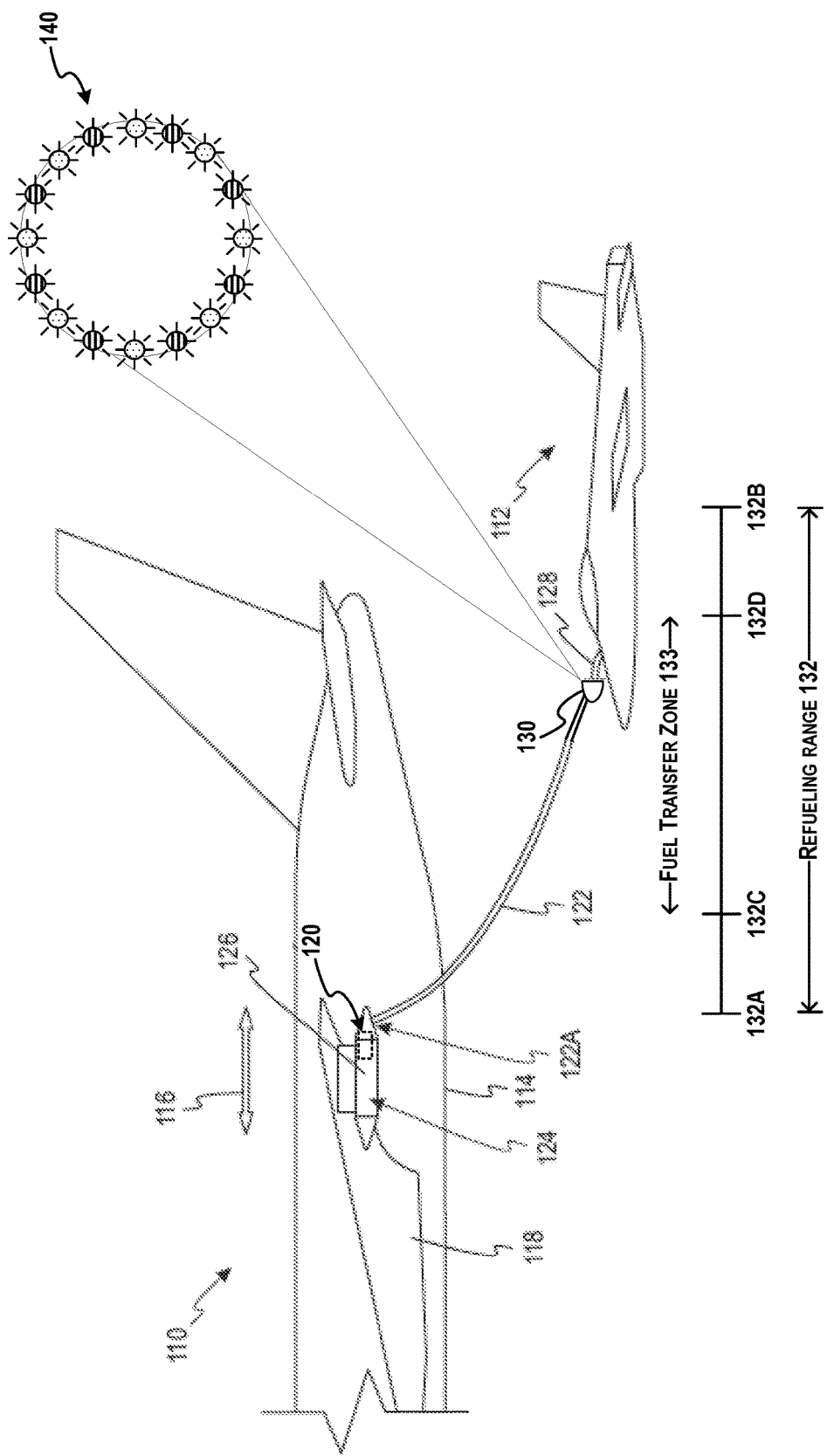
FIG. 10 depicts another example aerial refueling operation and corresponding example visual indication generated by the plurality of light sources during the refueling operation, according to an example implementation.

In other examples, such as shown in FIG. 8, the plurality of light sources 140 can be operated in a different visual indication to inform the receiver aircraft 112, after contact is made between the probe 128 and the refueling coupler 130, of a position of the receiver aircraft 112 with respect to the fuel transfer zone 133. For example a bottom portion 178 of the plurality of light sources 140 are illuminated in a first color (e.g., yellow) and intensity, a top portion 180 of the plurality of light sources 140 are illuminated in a second color (e.g., green) and intensity, and one light source 182 is illuminated in a third color (e.g., white) and intensity to indicate a position of the receiver aircraft with respect to the fuel transfer zone 133. When the receiver aircraft is in the fuel transfer zone 133, one of the light sources in the top portion 180 is illuminated white (e.g., the light source 182). A position of a light source in the top portion 180 that is illuminated white depends on a position of the receiver aircraft 112 with respect to points 132C and 132D of the fuel transfer zone 133. As the receiver aircraft 112 approaches end points 132C and 132D of the fuel transfer zone 133, the light source in the top portion 180 that is illuminated white moves from left to right, and if the receiver aircraft 112 falls out of the fuel transfer zone 133, a light source in the bottom portion 178 is illuminated white. Thus, the plurality of light sources 140 on the bottom portion 178 and the top portion 180 can be operated to generate a visual indication that informs the pilot of the receiver aircraft 112 of relative positioning of the receiver aircraft 112 in the fuel transfer zone 133.

Once the refueling system 120 is supplying fuel to the receiver aircraft 112, the hose sensing system 156 senses these conditions, generates refueling information based on the sensed conditions, and communicates the refueling information to the control processor 160. The control processor 160 sends the information (indicator command and status) to the second transceiver 138, which transmits the information to the first transceiver 136 at the refueling coupler 130. Additionally or alternatively, the fuel pressure sensor 170 may be in the fluid flow path, and can detect a pressure of the fuel being transferred and output a signal to the processor 142. The processor 142 can then operate the plurality of light sources 140 to provide a visual indication corresponding to a pattern that informs the pilot of the receiver aircraft 112 that fuel is being transferred, such as the example pattern shown in FIG. 9.

Within additional examples, the refueling information can include an indication of a quantity of fuel transferred to the receiver aircraft 112, and the processor 142 can operate the plurality of light sources 140 to generate a visual indication that represents the quantity of fuel transferred. The first transceiver 136 can receive information indicating the quantity of fuel transferred from the second transceiver 138 in the tanker aircraft 110, and send the information to the processor 142. Optionally, the processor 142 can also receive information to determine the quantity of fuel transferred from the fuel pressure sensor 170 in the refueling coupler 130, for example.

Once transfer of fuel is completed, the hose sensing system 156 senses a desired quantity of fuel has been transferred, generates refueling information based on the sensed conditions, and communicates the refueling information to the control processor 160. The control processor 160 sends the information (indicator command and status) to the second transceiver 138, which transmits the information to the first transceiver 136 at the refueling coupler 130. Accordingly, the processor 142 operates the plurality of light sources 140 in a visual indication corresponding to a pattern that informs the pilot of the receiver aircraft 112 of a fuel transfer completed indication, and a receiver aircraft is clear for disconnect indication, such as the example pattern shown in FIG. 10.

The plurality of light sources 140 and visual indications shown in FIGS. 4-10 are illustrated using different shading, and the shading may be representative of a specific color and/or intensity of light as well. In addition, the different patterns and visual indications illustrated by the plurality of light sources 140 in FIGS. 4-10 represent example different visual indications to be displayed at the corresponding different sequential points during the aerial refueling operations.

Fewer or additional visual indications may be used, as needed, to inform of fewer or additional sequential points during the refueling operations, and/or to inform of additional information during the refueling operations.

As an example, the refueling information can also indicate a distance between the receiver aircraft 112 and the tanker aircraft 110, and such information can be communicated to the pilot of the receiver aircraft 112 through a predefined visual indication of the plurality of light sources 140. To determine the distance, after contact of the refueling coupler 130 with the probe 128 is detected (e.g., by outputs of the sensor(s) 166), the first transceiver 136 may send a signal to the second transceiver 138 to indicate that contact has been made, and the second transceiver 138 may respond by sending information indicating the length of the hose 122 deployed. The length of the hose 122 deployed in this scenario can be an estimate of the distance between the receiver aircraft 112 and the tanker aircraft 110. Then, the processor 142 operates the plurality of light sources 140 such that a light intensity generated by the plurality of light sources 140 is based on the distance between the receiver aircraft 112 and the tanker aircraft 110. For example, the plurality of light sources 140 may initially be bright, but after contact, the plurality of light sources 140 may be dimmed.

The distance between the receiver aircraft 112 and the tanker aircraft 110 can also simply be based on the length of the hose 122 deployed plus additional unknown/estimated distance (when no contact of the refueling coupler 130 to the probe 128 is detected). In this example, the processor 142 may operate the plurality of light sources 140 in a visual indication that is bright to enable the receiver aircraft 112 to see the refueling coupler 130. Thus, the plurality of light sources 140 change in intensity (get brighter or dimmer) as the receiver aircraft 112 becomes closer to or farther from the tanker aircraft 110.

In another example, the refueling information indicates the distance between the receiver aircraft 112 and the tanker aircraft 110, and the processor 142 operates the plurality of light sources 140 to blink at different frequencies indicating whether the distance between the receiver aircraft 112 and the tanker aircraft 110 is increasing or decreasing. Here, the blinking of the plurality of light sources 140 includes operating the plurality of light sources 140 to turn on and off at a specific frequency.

By providing the visual indication on the refueling coupler 130, a lighting pattern is easily visible by the pilot of the receiver aircraft 112 to see for feedback on the refueling operations. Thus, rather than having to view markings on the hose 122 to determine a length of hose deployed and when to connect with the refueling coupler 130, the visual indications on the refueling coupler 130 can provide such information more clearly to a pilot of the receiver aircraft 112.

Figure 11:
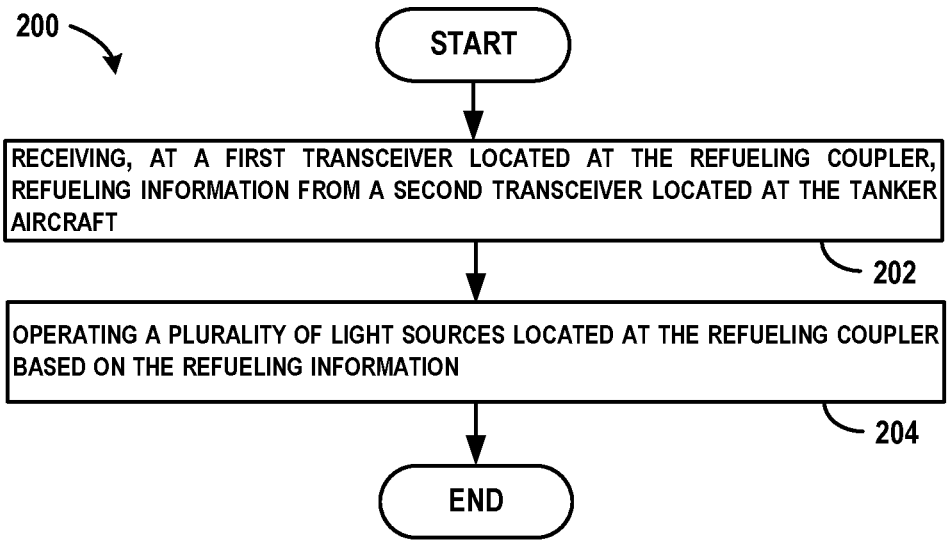
FIG. 11 is a flowchart for a method of providing indications to a receiver aircraft during a refueling operation using an indication system of a refueling system, according to an example implementation.

FIG. 11 is a flowchart for a method 200 of providing indications to a receiver aircraft 112 during a refueling operation using an indication system 134 of a refueling system 120, according to an example implementation. As described above, the refueling system 120 includes the hose 122 for supplying fuel from the tanker aircraft 110 to the receiver aircraft 112 and the refueling coupler 130 coupled to the end 122B of the hose 122.

At block 202, the method 200 includes receiving, at the first transceiver 136 located at the refueling coupler 130, refueling information from the second transceiver 138 located at the tanker aircraft 110. At block 204, the method 200 includes operating the plurality of light sources 140 located at the refueling coupler 130 based on the refueling information.

In some examples, the tanker aircraft 110 may include multiple hoses and associated refueling couplers to enable refueling multiple receiver aircraft 112 at the same time. In such examples, each individual refueling coupler communicates with a designated refueling system onboard the tanker aircraft using appropriate system signaling and a unique electronic drogue identifier, for example.

Figure 12:
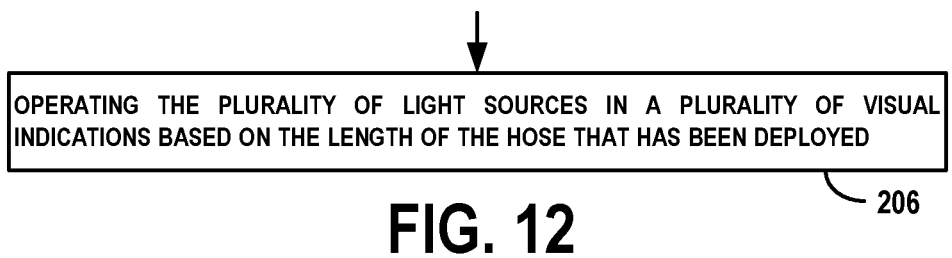
FIG. 12 depicts additional or alternative functions that can be performed in connection with the method shown in FIG. 11.

FIG. 12 depicts additional or alternative functions that can be performed in connection with the method 200 shown in FIG. 11. As shown in FIG. 12, at block 206, the method 200 can further include operating the plurality of light sources 140 in a plurality of visual indications based on the length of the hose 122 that has been deployed.

Figure 13:
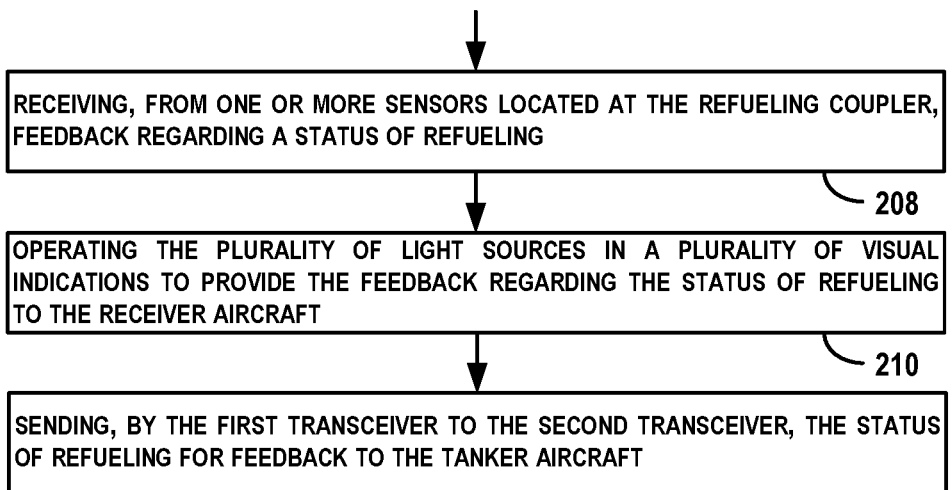
FIG. 13 depicts additional or alternative functions that can be performed in connection with the method shown in FIG. 11.

FIG. 13 depicts additional or alternative functions that can be performed in connection with the method 200 shown in FIG. 11. As shown in FIG. 13, at block 208, the method 200 can further include receiving, from one or more sensors 166 located at the refueling coupler 130, feedback regarding a status of refueling. At block 210, the method 200 can further includes operating the plurality of light sources 140 in a plurality of visual indications to provide the feedback regarding the status of refueling to the receiver aircraft 112, and at block 212, the method 200 further includes sending, by the first transceiver 136 to the second transceiver 138, the status of refueling for feedback to the tanker aircraft 110.

Accordingly, the second transceiver 138 located in the tanker aircraft 110 can transmit information to the first transceiver 136 located at the refueling coupler 130 indicating a system status (e.g., ready/not ready for contact) and a hose length indication. The first transceiver 136 can transmit feedback information to the second transceiver 138 located in the tanker aircraft 110 indicating a latching status, coupler health, hose fuel pressure, etc. in order to provide information to the pilot of the tanker aircraft 110. The tanker aircraft 110 and the receiver aircraft 112 also have an audio communication line between them enabling the pilots to talk to each other, and the indication system 134 provides a visual lighting output to communicate possibly duplicate information to the receiver aircraft 112. The receiver pilot can verbally request the tanker aircrew to adjust the lighting intensity.

Any of the blocks shown in FIGS. 11-13 may represent a module, a segment, or a portion of program code, which includes one or more instructions executable by a processor, such as processor 142 or processor 160, for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

In FIGS. 11-13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11-13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

By the term "substantially" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An indication system for use with a refueling system including a hose for supplying fuel from a tanker aircraft to a receiver aircraft and a refueling coupler coupled to an end of the hose, the indication system comprising:
    a first transceiver located at the refueling coupler and configured to receive refueling information from a second transceiver located at the tanker aircraft;
    a plurality of visual light sources located at the refueling coupler; and
    a processor in communication with the first transceiver to receive the refueling information, and in communication with the plurality of visual light sources to operate the plurality of visual light sources such that the refueling information is visually observable by an operator of the receiver aircraft, and
    wherein the tanker aircraft includes a control processor in communication with the second transceiver, wherein the first transceiver receives from the second transceiver information indicating a length of a hose that has been deployed during refueling, wherein the length of the hose is determined by the control processor.

2. The indication system of claim 1, wherein the processor operates the plurality of visual light sources in a plurality of visual indications based on the length of the hose that has been deployed.

3. The indication system of claim 1, wherein the processor operates the plurality of visual light sources in a plurality of visual indications, wherein the plurality of visual indications include a tanker refueling system not ready indication, a refueling system ready indication, an engaged and latched indication, a receiver aircraft connected and inside a fuel transfer zone (FTZ) but no fuel flow indication, a receiver aircraft connected and inside the FTZ with fuel transfer indication, an emergency separation indication, a receiver aircraft connected but too close to the tanker aircraft and outside of the FTZ indication, and a receiver aircraft connected but too far from the tanker aircraft and outside of the FTZ indication.

4. The indication system of claim 1, wherein the plurality of visual light sources include a plurality of colored light emitting diodes, and the processor operates the plurality of visual light sources to generate a plurality of visual indications having different colors.

5. The indication system of claim 1, wherein the refueling information indicates a distance between the receiver aircraft and the tanker aircraft, and wherein the processor operates the plurality of visual light sources such that a light intensity generated by the plurality of visual light sources is based on a distance between the receiver aircraft and the tanker aircraft.

6. The indication system of claim 1, wherein the refueling information indicates a distance between the receiver aircraft and the tanker aircraft, and wherein the processor operates the plurality of visual light sources to blink at different frequencies indicating whether the distance between the receiver aircraft and the tanker aircraft is increasing or decreasing.

7. The indication system of claim 1, wherein the refueling information comprises an indication of a quantity of fuel transferred to the receiver aircraft, and wherein the processor operates the plurality of visual light sources to generate a visual indication that represents the quantity of fuel transferred, a fuel transfer completed indication, and a receiver aircraft is clear for disconnect indication.

8. The indication system of claim 1, further comprising a second set of light sources configured to illuminate an interior of the refueling coupler.

9. The indication system of claim 8, wherein the plurality of visual light sources are positioned on a peripheral region of the refueling coupler, and the second set of light sources are positioned in the interior of the refueling coupler.

10. The indication system of claim 1, further comprising: one or more sensors located at the refueling coupler and in communication with the processor to provide feedback regarding a status of refueling to the processor, wherein the processor operates the plurality of visual light sources to generate a plurality of visual indications to provide the feedback regarding the status of refueling to the receiver aircraft.

11. The indication system of claim 10, wherein the first transceiver receives the status of refueling from the processor and sends the status of refueling to the second transceiver for feedback to the tanker aircraft.

12. The indication system of claim 10, wherein the one or more sensors include an inertial measurement unit (IMU) to measure a location of the receiver aircraft once coupled to the refueling coupler, and wherein the processor operates the plurality of visual light sources in a visual indication based on the location.

13. The indication system of claim 10, wherein the one or more sensors include one or more strain gauges to detect contact with the refueling coupler, and wherein the processor operates the plurality of visual light sources in a visual indication based on the detection of contact with the refueling coupler.

14. The indication system of claim 10, wherein the one or more sensors include a fuel pressure sensor to detect a pressure of fuel during transfer of fuel.

15. The indication system of claim 10, wherein the one or more sensors include a latch sensor to detect that the refueling coupler has engaged with the receiver aircraft,
wherein the processor operates the plurality of visual light sources in a visual indication based on the detection that the refueling coupler has engaged with the receiver aircraft, and
wherein the first transceiver receives, from the processor, information indicating the detection that the refueling coupler has engaged with the receiver aircraft and sends the information indicating the detection that the refueling coupler has engaged with the receiver aircraft to the second transceiver for feedback to the tanker aircraft.

16. An indication system for use with a refueling system including a hose for supplying fuel from a tanker aircraft to a receiver aircraft and a refueling coupler coupled to an end of the hose, the indication system comprising:
one or more sensors located at the refueling coupler to provide feedback regarding a status of refueling;
a first transceiver located at the refueling coupler and configured to receive refueling information from a second transceiver located at the tanker aircraft, and in communication with the one or more sensors to send the status of refueling to the first transceiver for feedback to the tanker aircraft;
a plurality of light sources located at the refueling coupler; and
a processor in communication with the first transceiver to receive the refueling information, in communication with the one or more sensors to receive the feedback regarding the status of refueling, and in communication with the plurality of light sources to operate the plurality of light sources in a plurality of visual indications based on the refueling information and the status of refueling.

17. A method for providing indications to a receiver aircraft during a refueling operation using an indication system of a refueling system, wherein the refueling system includes a hose for supplying fuel from a tanker aircraft to a receiver aircraft and a refueling coupler coupled to an end of the hose, the method comprising:
receiving, at a first transceiver located at the refueling coupler, refueling information from a second transceiver located at the tanker aircraft, wherein the refueling information comprises a length of the hose that has been deployed during refueling; and
operating a plurality of visual light sources located at the refueling coupler such that the refueling information is visually observable by an operator of the receiver aircraft, wherein operating the plurality of visual light sources located at the refueling coupler comprises operating the plurality of visual light sources in a plurality of visual indications based on the length of the hose that has been deployed.

18. The method of claim 17, further comprising:
receiving, from one or more sensors located at the refueling coupler, feedback regarding a status of refueling;
operating the plurality of visual light sources in a plurality of visual indications to provide the feedback regarding the status of refueling to the receiver aircraft; and
sending, by the first transceiver to the second transceiver, the status of refueling for feedback to the tanker aircraft.

19. The method of claim 17, wherein the refueling information indicates a distance between the receiver aircraft and the tanker aircraft, and wherein operating the plurality of visual light sources further comprises operating the plurality of visual light sources such that a light intensity generated by the plurality of visual light sources is based on a distance between the receiver aircraft and the tanker aircraft.

20. The method of claim 17, wherein the refueling information comprises an indication of a quantity of fuel transferred to the receiver aircraft, and wherein operating the plurality of visual light sources comprises operating the plurality of visual light sources to generate a visual indication that represents the quantity of fuel transferred, a fuel transfer completed indication, and a receiver aircraft is clear for disconnect indication.

* * * * *